Sept. 30, 1969 IWAJIRO HOJYO 3,469,292

PRESHRINKING MACHINE FOR FABRICS AND THE LIKE

Filed June 6, 1967

Iwajiro Hojyo
INVENTOR.

BY George B. Onyeally
Attorney

United States Patent Office 3,469,292
Patented Sept. 30, 1969

3,469,292
PRESHRINKING MACHINE FOR FABRICS
AND THE LIKE
Iwajiro Hojyo, Kyoto-shi, Japan, assignor to Kinyosha
Company Limited, Tokyo, Japan, a corporation of Japan
Filed June 6, 1967, Ser. No. 644,020
Int. Cl. D06c 21/00
U.S. Cl. 26—69                                                 2 Claims

ABSTRACT OF THE DISCLOSURE

Preshrinking machine for fabrics and the like comprising a rotary heating drum, a rubber roller pressed against the heating drum and a relatively thin resilient belt intervening between said rotary heating drum and said rubber roller, wherein a fabric or the like to be preshrunk is introduced between the peripheral surface of the heating drum and the surface of the resilient belt disposed on the peripheral surface of said rubber roller so that the material may be compacted in passing between the heating drum and the rubber roller.

Background of the invention

The present invention relates to a preshrinking machine for fabrics and the like.

One commonly used mechanism for imparting shrinkage to fabrics has a rotary heating drum and a rubber belt which is large and thick and runs over substantially half of the periphery of the drum. The rubber belt is stretched around guide rolls in such a manner that it is pressed against the rotary heating drum. The prior-art machine of the above described type utilizes the thickness of the rubber belt for imparting shrinkage to the fabric so that a rubber belt having a sufficiently large thickness is required. With such a rubber belt having a large thickness it has been difficult to obtain a required degree of shrinkage, since cracks, wear spots and irregularities are created on the working surface of the rubber belt during use. Also, a rubber belt of such a large thickness and of a length sufficient to be satisfactorily stretched around guide rolls has had a considerable weight and the replacement of such a heavy belt has been very troublesome and a disadvantage.

Brief summary of the invention

The present invention is intended to overcome the above mentioned difficulties and disadvantages of the conventional thick rubber belt of the preshrinking mechanism of the prior art by the provision of a novel preshrinking mechanism which does not use any thick rubber belt. According to the invention there is provided a preshrinking mechanism comprising a rotary heating drum, a rubber roller compressively engaging said heating drum and a relatively thin resilient belt passing between said rotary heating drum and said rubber roller, wherein the shrinkage of the fabric is effected by the elastic contraction or compaction of the rubber of the roller while said resilient belt merely serves to guide the fabric to be shrunk.

Detailed description of the invention

Figure 1:
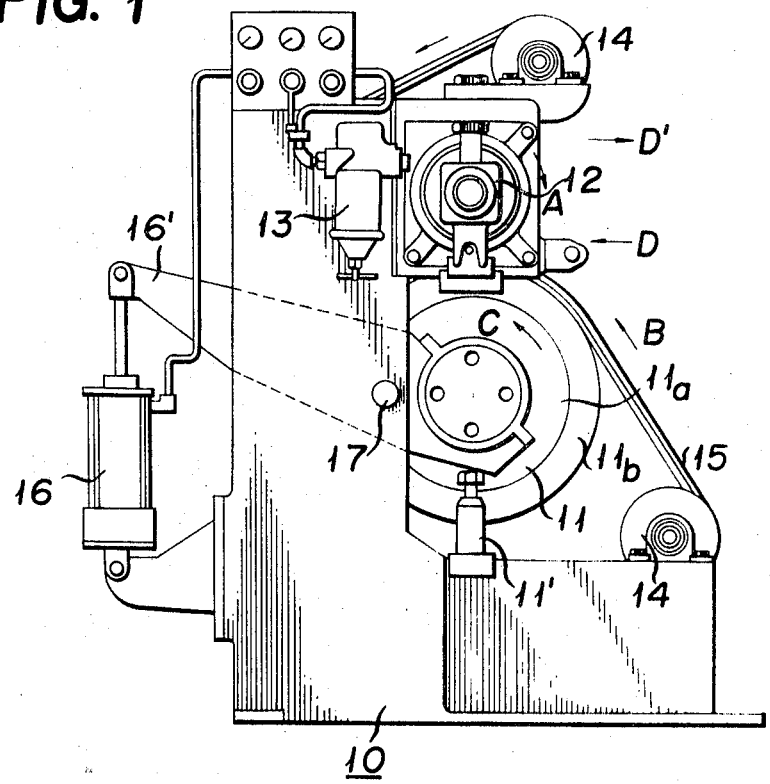
FIG. 1 is a partially exploded side elevational view of the preshrinking machine embodying the invention.
Figure 2:
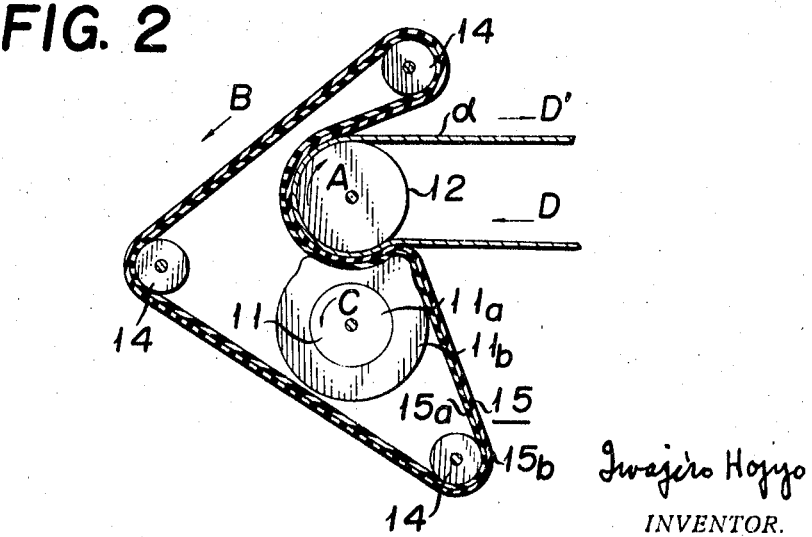
FIG. 2 is a schematic sectional view illustrating the preshrinking mechanism shown in FIG. 1 in more detail.

The invention is described in conjunction with a preferred embodiment thereof with reference to the accompanying drawing. Referring to FIG. 1, the reference numeral 10 generally designates an entire preshrinking apparatus. In the center of the apparatus is mounted a rotary rubber roller 11 consisting of a metal core drum 11a carrying a tubular rubber member 11b having a wall thickness of preferably 50 to 120 mm. The metal core drum 11a can be shifted vertically by means of arms 16', which are secured on the piston rod of an air cylinder assembly 16 operated by air pressure which is introduced through a control mechanism 13, and pivots about pivotal pins 17. Downward movement of the roller is limited by an adjustable threaded stop pin 11'. Over the rubber roller 11 is provided a heating drum 12 rotatable by a driving means not shown and in compressive rolling engagement with the rubber roller. The heating drum is heated by hot steam introduced therein through a heating mechanism. A rubber belt 15 is trained around guide rollers 14 and runs over substantially half of the surface of the heating drum where it is sandwiched and compressed between the heating drum 12 and the rubber roller 11 as shown in FIG. 2. Said rubber belt 15 consists of a lamination of an inner rubber sublayer 15a about 5 mm. thick and an outer rubber sublayer 15b about 10 mm. thick, and having a JIS hardness of about 20 to 40 degrees and modulus of elasticity substantially similar to that of the rubber roller 11.

In operation of the above described machine the rubber belt 15 sandwiched between the heating drum 12 and the rubber roller 11 is subjected to a predetermined compression by urging the rubber roller toward the heating drum by the adjustment of the piston cylinder assembly 16 and the stop pin 11', and the heating drum 12 is rotated by driving means, not shown, in the direction of arrow A thereby driving the rubber belt 15 and rubber roller 11 in the directions of arrows B and C, respectively. The fabric indicated at α, which has been pretreated to have a suitable moisture, is introduced between the rubber belt 15 and the heating drum 12 from the direction of arrow D and is pressed against the heating drum 12 by the rubber roller 11 through the rubber belt 15 which is stretched about the circular surface of the heating drum 12 before emerging in the direction of D'. At this time, the rubber belt 15 in contact with the fabric α experiences a converging compressive force due to elastic deformation of the tubular rubber member 11b of the rubber roller 11 which is urged against the heating drum 12. This converging compressive force is transmitted through the rubber belt 15 to the fabric α while it is heated. Although the rubber belt 15 has a compressive effect to a slight extent according to the compressive effect afforded by the rubber member 11b it rather serves to transmit compressive force exerted by the rubber member 11b by virtue of its small thickness. The double layer construction of the rubber belt 15 has an advantage in that desired patterns or designs may be put on the fabric α by providing the outer rubber layer 15b with a certain pattern or design. Of course, a rubber belt of a single-layer construction may attain the same preshrinkage effect.

Preshrinking tests were conducted by using the above described preshrinking machine. As the sample cloths were used E/R Tropical (Sample 1) and E/R Broad (Sample 2), with dimensions of about 300 mm. wide and about 1500 mm. long and which have been previously sized, refined and blanched. Test pieces of the above specified cloths whose moisture content had been previously adjusted were used for every single test. The machine was operated with the temperature of the surface of the heating roller maintained at 80° C. and compressive pressures against the heating drum by the rubber roller of 0.5 kg./cm.$^2$, 1.0 kg./cm.$^2$, 2.0 kg./cm.$^2$, and 3.0 kg./cm.$^2$, and a constant circumferential speed of the heating roller of 1.0 meter per minute. Each rubber belt used for the machine had a thickness of 15 mm.

and a length of about 3000 mm. The thickness of the tubular rubber member of the rubber roller was 50 mm. Longitudinal tension was exerted on the fabric when it entered between the heating drum and the rubber roller by hand (to exert a uniform tensile force the free edge of the fabric was wound on a rod) and tension was not exerted on the fabric when it went out of the apparatus; lateral tension was not applied to the fabric. The results of the tests are shown on the following table.

Table

| Compressive pressure: | Average shrinking percentage |
|---|---|
| 0.5 kg./cm.²: | |
| Sample 1 | 13.4 |
| Sample 2 | 9.0 |
| 1.0 kg./cm.²: | |
| Sample 1 | 16.5 |
| Sample 2 | 12.0 |
| 2.0 kg./cm.²: | |
| Sample 1 | 20.4 |
| Sample 2 | 16.1 |
| 3.0 kg./cm.²: | |
| Sample 1 | 22.5 |
| Sample 2 | 17.5 |

It will be seen that at the roll surface temperature of 80° C., a shrinking percentage of 9.0 to 13.0 is obtained with a pressure of 0.5 kg./cm.², with the percentage increasing to 12.0 to 16.0% and up to 20.0% with increased pressure of 1.0 kg./cm.² and 2.0 kg./cm.², respectively. In general shrinking percentages of from 9.0 to 20.0% may be attained depending upon various compressive pressures and the nature of the material.

As has been heretofore described, according to the invention preshrinkage is effected not by the rubber belt as in the conventional machine but by the rubber roller, with the rubber belt merely serving to convey the fabric or the like and to transmit the compressive effect to it. Accordingly, there is no need of taking the compressive effect of the rubber belt into consideration, so that a relatively thin belt may be used. By way of example, in comparison with a conventional rubber belt which usually has a thickness of about 55 mm., width of 1350 to 1850 mm. and an overall length of 3962 mm., with a weight amounting to 400 to 600 kg., the rubber belt for use in the preshrinking machine according to the present invention may be of a thickness of 20 mm. at the utmost with an overall length being about 3000 mm. Accordingly, replacement of the rubber belt is very easy, and the rubber belt is almost free from cracks on the belt surface, wear spots, and irregularities in elasticity which have heretofore been encountered in conventional thick rubber belts, making it possible to afford rubber belts showing a desired and uniform degree of shrinkage.

The preceding description has been concerned with a preshrinking machine particularly for fabrics, but similar effects may, of course, be attained when it is used for shrinkage or compaction of other materials such as paper.

What is claimed is:

1. A preshrinking machine for fabrics comprising a frame and a pair of rotatable cylindrical members supported therein, said pair of members being disposed so that they have circumferential cylindrical surfaces aligned with each other, one of said members being a heating drum and the other being a rubber roller, guide means supported in said frame, and a double layer rubber resilient belt having a design on one face thereof which is disposed to contact said fabric, said resilient belt being guided by said guide means and traveling around in close contact over about one half of the circumferential surface of said heating drum member so as to press fabric which is to be preshrunk thereto, the fabric as an elongated sheet traveling along a path between said rubber roller and said heating drum member through a zone of compression formed by said resilient belt traveling over about one-half of the circumferential surface of said heating drum member, and mechanical means to press together the surfaces of both said rotatable members so that said resilient belt is therebetween causing a part of the surface of the rubber roller member to be elastically deformed adjacent that portion of the heating drum member where said resilient belt first contacts said heating drum member.

2. The preshrinking machine according to claim 1 wherein said mechanical means includes a piston-cylinder assembly and a stop pin held by said frame so as to adjust the degree of compression of said rubber roller against said heating drum.

References Cited

UNITED STATES PATENTS

| 2,078,904 | 4/1937 | Cluett | 26—18.6 |
| 2,146,694 | 2/1939 | Wrigley et al. | 26—18.6 |
| 2,263,712 | 11/1941 | Wrigley et al. | 26—18.6 |
| 2,535,734 | 12/1950 | Grettve. | |
| 2,713,785 | 7/1955 | Friedman. | |
| 2,825,117 | 3/1958 | Evans et al. | 26—18.6 XR |
| 3,002,251 | 10/1961 | Screeton et al. | 26—18.6 |
| 3,114,957 | 12/1963 | Schaab et al. | |
| 3,100,925 | 8/1963 | Messinger | 26—18.6 |

ROBERT R. MACKEY, Primary Examiner

U.S. Cl. X.R.

26—18.6